(12) United States Patent
Otsuka

(10) Patent No.: US 8,182,708 B2
(45) Date of Patent: *May 22, 2012

(54) METHOD OF FINISHING PRE-POLISHED GLASS SUBSTRATE SURFACE

(75) Inventor: Koji Otsuka, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 1157 days.

This patent is subject to a terminal disclaimer.

(21) Appl. No.: 11/956,708

(22) Filed: Dec. 14, 2007

(65) Prior Publication Data

US 2008/0142480 A1 Jun. 19, 2008

Related U.S. Application Data

(63) Continuation of application No. PCT/JP2006/312372, filed on Jun. 14, 2006.

(30) Foreign Application Priority Data

Jun. 14, 2005 (JP) .............................. P2005-173505

(51) Int. Cl.
*G01L 21/30* (2006.01)
(52) U.S. Cl. ............... 216/59; 216/60; 216/62; 216/66; 216/76; 216/80
(58) Field of Classification Search .................... 216/59, 216/60, 62, 66, 76, 80
See application file for complete search history.

(56) References Cited

U.S. PATENT DOCUMENTS

| | | | |
|---|---|---|---|
| 6,251,835 B1 * | 6/2001 | Chu et al. ...................... 505/411 |
| 6,465,272 B1 * | 10/2002 | Davis et al. ..................... 438/72 |
| 7,803,280 B2 * | 9/2010 | Otsuka et al. .................. 216/12 |
| 7,998,645 B2 * | 8/2011 | Otsuka et al. ..................... 430/5 |
| 2002/0005676 A1 * | 1/2002 | Greer ............................. 310/312 |
| 2002/0185611 A1 | 12/2002 | Menapace et al. |

(Continued)

FOREIGN PATENT DOCUMENTS

GB  0 084 988 A1  4/1982

(Continued)

OTHER PUBLICATIONS

Allen Kirkpatrick, "Gas cluster ion beam applications and equipment", Nuclear Instruments and Methods in Physics Research, Section B 206: Beam Interactions with Materials and Atoms. 2003, pp. 830-837.

(Continued)

*Primary Examiner* — Binh X Tran
(74) *Attorney, Agent, or Firm* — Oblon, Spivak, McClelland, Maier & Neustadt, L.L.P.

(57) ABSTRACT

The present invention is to provide a method by which the waviness generated in a glass substrate surface during pre-polishing are removed and the glass substrate is finished so as to have a highly flat surface. The present invention relates a method of finishing a pre-polished glass substrate surface, the glass substrate being made of quartz glass containing a dopant and comprising $SiO_2$ as a main component, the finishing method comprising: measuring a concentration distribution of the dopant contained in the glass substrate; and measuring a surface shape of the glass substrate in the pre-polished state, wherein conditions for processing the glass substrate surface are set for each part of the glass substrate based on the measurement results of the concentration distribution of the dopant and the surface shape of the glass substrate.

20 Claims, 4 Drawing Sheets

U.S. PATENT DOCUMENTS

2004/0060900 A1* 4/2004 Waldhauer et al. ............... 216/2

FOREIGN PATENT DOCUMENTS

| | | |
|---|---|---|
| JP | 8-120470 | 5/1996 |
| JP | 2003-505891 | 2/2003 |
| WO | WO 98/15504 | 4/1998 |
| WO | WO 01/07967 A1 | 2/2001 |
| WO | WO 02/088787 A2 | 11/2002 |

OTHER PUBLICATIONS

Office Action issued Sep. 23, 2010 in European Application No. 06 767 031.5.
U.S. Appl. No. 12/475,878, filed Jun. 1, 2009, Otsuka, et al.
U.S. Appl. No. 12/648,481, filed Dec. 29, 2009, Ito, et al.

* cited by examiner

METHOD OF FINISHING PRE-POLISHED GLASS SUBSTRATE SURFACE

TECHNICAL FIELD

The present invention relates to a method of finishing a pre-polished glass substrate surface. More particularly, the invention relates to a method of finishing a surface of a glass substrate required to have a high degree of flatness, like the glass substrates for use as reflective type masks for EUV (extreme ultraviolet) lithography in semiconductor device production steps.

BACKGROUND ART

In lithography, lithographic exposure tools for transferring a fine circuit pattern onto a wafer to produce an integrated circuit have been extensively used. With the trend toward higher degrees of integration, higher speeds, and higher functions in integrated circuits, the integrated circuits are becoming finer and the lithographic exposure tools are required to have a large focal depth and form a high-resolution circuit pattern image on a wafer surface. The wavelengths of exposure light sources are becoming shorter. ArF excimer lasers (wavelength, 193 nm) have come to be used as exposure light sources in place of the g-line (wavelength, 436 nm), i-line (wavelength, 365 nm), and KrF excimer lasers (wavelength, 248 nm) heretofore in use. Furthermore, use of an $F_2$ laser (wavelength, 157 nm) as an exposure light source for conforming to next-generation integrated circuits having a line width of 100 nm or smaller is thought to be promising. However, the generations which can be covered by this light source are regarded as being limited to ones with line widths down to 70 nm.

Under such technological trends, a lithographic technique employing EUV light as a next-generation exposure light source is thought to be applicable to generations of 45 nm and finer and is attracting attention. EUV light means a light having a wavelength in the soft X-ray region or vacuum ultraviolet region. Specifically, it is a light having a wavelength of about 0.2-100 nm. At present, use of a lithographic light source of 13.5 nm is being investigated. The exposure principal in this EUV lithography (hereinafter abbreviated as "EUVL") is equal to that in the conventional lithography in that a mask pattern is transferred with an optical projection system. However, since there is no material which transmits light in the EUV light energy region, a refractive optical system cannot be used and a reflective optical system should be used (see patent document 1).

The mask for use in EUVL is basically constituted of (1) a glass substrate, (2) a reflecting multilayered film formed on the glass substrate, and (3) an absorber layer formed on the reflecting multilayered film. As the reflecting multilayered film is used a film having a structure formed by periodically superposing, in a nanometer-order thickness, materials differing in refractive index at the wavelength of the exposure light. Known typical materials are molybdenum and silicon. Tantalum and chromium are being investigated as materials for the absorber layer. The glass substrate is required to be a material having a low coefficient of thermal expansion so as not to be distorted even upon EUV irradiation. Use of a glass having a low coefficient of thermal expansion or a crystallized glass having a low coefficient of thermal expansion is being investigated. In this description, glasses having a low coefficient of thermal expansion and crystallized glasses having a low coefficient of thermal expansion are hereinafter referred to inclusively as "low-expansion glasses" or "ultralow-expansion glasses".

The low-expansion glass or ultralow-expansion glass most widely used in EUVL masks is quartz glass which comprises $SiO_2$ as the main component and contains $TiO_2$, $SnO_2$, or $ZrO_2$ as a dopant so as to have a reduced coefficient of thermal expansion.

A glass substrate is produced by processing such a glass or crystallized-glass material with high accuracy and cleaning it. A glass substrate is processed generally in the following manner. A surface of the glass substrate is pre-polished at a relatively high processing rate until the surface comes to have a given degree of flatness and a given surface roughness. Thereafter, the glass substrate surface is finished by a method having higher processing accuracy or under processing conditions bringing about higher processing accuracy so as to result in a desired degree of flatness and surface roughness.

Patent Document 1: JP-T-2003-505891

DISCLOSURE OF THE INVENTION

There are cases where, when a glass substrate for use in an EUVL mask is processed, this processing results in partial waviness in the glass substrate surface. The present inventors found that this generation of waviness is attributable to partial differences in composition in the glass substrate, more specifically, to the distribution of the concentration of the dopant contained in the glass substrate. Either of pre-polishing and finishing may cause waviness in the glass substrate surface. However, there is a possibility that pre-polishing, which has a high processing rate, might cause larger waviness in the glass substrate surface. In the case where pre-polishing has caused large waviness, it has been difficult for finishing to remove the waviness to impart a desired degree of flatness to the glass substrate surface. There also are cases where the waviness caused by pre-polishing grows to larger waviness during finishing.

An object of the invention is to provide a method by which the waviness which was generated in a glass substrate surface during pre-polishing is removed and the glass substrate is finished so as to have a highly flat surface to thereby eliminate the problem described above.

In order to accomplish that object, the invention provides a method of finishing a pre-polished glass substrate surface, the glass substrate being made of quartz glass containing a dopant and comprising $SiO_2$ as a main component, the finishing method comprising:

measuring a concentration distribution of the dopant contained in the glass substrate; and measuring a surface shape of the glass substrate in the pre-polished state, wherein conditions for processing the glass substrate surface are set for each part of the glass substrate based on the measurement results of the concentration distribution of the dopant and the surface shape of the glass substrate (hereinafter, this method is referred to as "the finishing method of the invention").

In the finishing method of the invention, it is preferred that correlation between the concentration of the dopant contained in the glass substrate and the rate of processing the glass substrate surface be determined beforehand, and the conditions for processing the glass substrate surface are set for each part of the glass substrate based on the measurement results of the concentration distribution of the dopant and the correlation between the dopant concentration and the processing rate.

In the finishing method of the invention, it is preferred that the degree of flatness of the glass substrate surface be determined from the measurement results of the surface shape of the glass substrate, and the conditions for processing the glass substrate surface are set for each part of the glass substrate based on the degree of flatness of the glass substrate surface.

In the finishing method of the invention, the processing of the glass substrate surface is preferably conducted by a processing technique selected from the group consisting of ion-beam etching, gas-cluster ion-beam etching, plasma etching, nano-abrasion, and MRF (magnetorheological finishing).

In the finishing method of the invention, it is preferred that the processing technique is ion-beam etching, gas-cluster ion-beam etching, or plasma etching, the width of waviness present on the glass substrate surface is specified from the measurement results of the surface shape of the glass substrate, and the processing is conducted with a beam having a diameter in terms of FWHM (full width of half maximum) not larger than the width of the waviness.

Preferably, the beam diameter in terms of FWHM is not larger than one-half the width of the waviness.

In the finishing method of the invention, the processing technique is preferably gas-cluster ion-beam etching.

As a source gas for the gas-cluster ion-beam etching, preferably used is a mixed gas selected from the group consisting of an $SF_6/O_2$ mixed gas, an $SF_6/Ar/O_2$ mixed gas, an $NF_3/O_2$ mixed gas, an $NF_3/Ar/O_2$ mixed gas, an $NF_3/N_2$ mixed gas, and an $NF_3/Ar/N_2$ mixed gas.

The source gas is more preferably a mixed gas selected from the group consisting of an $SF_6/O_2$ mixed gas, an $SF_6/Ar/O_2$ mixed gas, an $NF_3/O_2$ mixed gas, and an $NF_3/Ar/O_2$ mixed gas.

In the finishing method of the invention, the glass substrate preferably comprises a low-expansion glass having a coefficient of thermal expansion at 20° C. of 0±30 ppb/° C.

In the finishing method of the invention, the dopant is preferably $TiO_2$.

In the finishing method of the invention, the glass substrate in the pre-polished state preferably has a surface roughness (Rms) of 5 nm or lower.

In the finishing method of the invention, a distribution of the concentration of the dopant contained in the glass substrate and a surface shape of the glass substrate in the pre-polished state are measured and conditions for processing the glass substrate surface are set for each of parts of the glass substrate based on the measurement results. Because of this, the waviness which was generated in the glass substrate surface during pre-polishing can be effectively removed. Furthermore, since conditions for processing the glass substrate surface are set for each of parts of the glass substrate based on the measurement results of the distribution of the concentration of the dopant contained in the glass substrate, there is no possibility that finishing might newly generate waviness in the glass substrate surface or the waviness generated in pre-polishing might grow during finishing.

By using the finishing method of the invention, the glass substrate can be finished so as to have a surface with excellent flatness. Thus, a glass substrate having excellent flatness can be obtained which is capable of conforming to, e.g., substrates for optical parts of lithographic exposure tools for producing next-generation semiconductor devices having a line width of 45 nm or smaller.

BEST MODE FOR CARRYING OUT THE INVENTION

Figure 1:
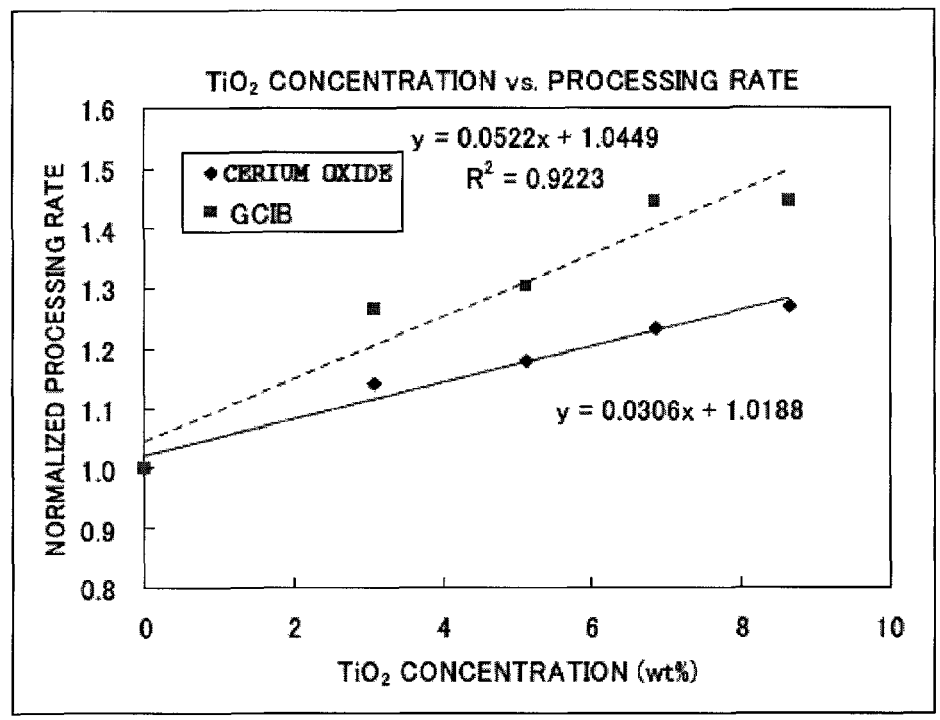
FIG. 1 is a graph showing correlations between dopant concentration and processing rate in doped quartz glass containing $TiO_2$ as a dopant.

The finishing method of the invention is a method of finishing a glass substrate surface which has undergone pre-polishing. More specifically, it is a method in which the waviness which was generated in the glass substrate surface during the pre-polishing is removed and the glass substrate is finished so as to have a surface with excellent flatness.

The pre-polishing is a procedure in which a glass substrate surface is processed at a relatively high processing rate to a some degree of flatness and surface roughness before being processed to a given flatness and surface roughness. The glass substrate which has been pre-polished is finished so as to have a given flatness and surface roughness.

The surface roughness (Rms) of the glass substrate in the pre-polished state is preferably 5 nm or lower, more preferably 1 nm or lower. In this description, the term "surface roughness" means the surface roughness measured through an examination of a 1-10 μm square area with an atomic force microscope. In case where the surface roughness of the pre-polished glass substrate exceeds 5 nm, the finishing of the glass substrate surface by the finishing method of the invention takes much time and this is a factor in a cost increase.

The processing technique to be used for the pre-polishing is not particularly limited and can be selected from a wide range of known processing techniques for glass surface processing. In general, however, a mechanical polishing technique is used because it has a high processing rate and a large area can be polished at a time when a polishing pad having a large surface area is used. The term "mechanical polishing technique" herein means a technique which includes mechanochemical polishing, in which the polishing function of abrasive grains is used in combination with the chemical polishing function of a chemical, besides polishing by the polishing function of abrasive grains alone. The mechanical polishing technique may be either of lapping and polishing, and the polishing device and abrasive material to be used can be suitably selected from known ones.

The term waviness means those periodic recesses and protrusions present on a glass substrate surface which have a period of 5-30 mm. The finishing method of the invention is a method by which the waviness generated in a glass substrate surface during pre-polishing is removed.

The finishing method of the invention is suitable for the finishing of a glass substrate for use in a reflective type mask for EUVL which can conform to the trend toward higher degrees of integration and higher fineness in integrated circuits. The glass substrate for use in this application is a glass substrate which has a low coefficient of thermal expansion and is reduced in fluctuations thereof. It preferably is made of a low-expansion glass having a coefficient of thermal expansion at 20° C. of 0±30 ppb/° C., and more preferably is made of an ultralow-expansion glass having a coefficient of thermal expansion at 20° C. of 0±10 ppb/° C.

Most widely used as such low-expansion glass and ultralow-expansion glass is quartz glass which comprises $SiO_2$ as the main component and to which a dopant has been added in order to reduce the coefficient of thermal expansion. A typical example of the dopant to be added in order to reduce the coefficient of thermal expansion is $TiO_2$. Examples of the low-expansion glass and ultralow-expansion glass to which $TiO_2$ has been added as a dopant include ULE (trademark) Code 7972 (manufactured by Corning Glass Works).

In the finishing method of the invention, the glass constituting the glass substrate is quartz glass comprising $SiO_2$ as the main component and containing a dopant. A typical example thereof is quartz glass to which $TiO_2$ has been added in order to reduce the coefficient of thermal expansion of the glass. However, the glass constituting the glass substrate is not limited to that and may be quartz glass which comprises $SiO_2$ as the main component and to which a dopant has been added for other purpose(s). In this description, quartz glasses which comprise $SiO_2$ as the main component and to which any dopant has been added are hereinafter referred to inclusively as "doped quartz glass".

Examples of doped quartz glass to which a dopant has been added for a purpose other than reduction of the coefficient of thermal expansion include doped quartz glass to which $La_2O_3$, $Al_2O_3$, $ZrO_2$, or nitrogen has been added in order to heighten the absolute refractive index of the glass and doped quartz glass to which fluorine has been added in order to heighten the laser resistance of the glass.

The dopant content in doped quartz glass varies depending on the kind of the dopant and the purpose of doping. In the case of doped quartz glass to which $TiO_2$ has been added in order to reduce the coefficient of thermal expansion of the glass, the $TiO_2$ content thereof is preferably 1-12% by mass based on the $SiO_2$. $TiO_2$ contents lower than 1% by mass may result in a possibility that the coefficient of thermal expansion of the glass cannot be sufficiently reduced. In case where the content of $TiO_2$ exceeds 12% by mass, the coefficient of thermal expansion becomes a large negative value, i.e., a value below −30 ppb/° C. The content of $TiO_2$ is more preferably 5-9% by mass.

As long as the waviness generated in a glass substrate surface during pre-polishing can be removed by the procedure described below, the finishing method of the invention is applicable to glass substrates made of glasses other than doped quartz glass. Consequently, the finishing method of the invention is thought to be applicable also to low-expansion crystallized glasses containing $TiO_2$ or $ZrO_2$ as crystal nuclei.

The shape, size, thickness, etc. of the glass substrate are not particularly limited. However, in the case where the substrate is for use in a reflective type mask for EUVL, it is a platy object having a rectangular or square planar shape.

The finishing method of the invention includes the following two measurement steps.

Step in which a distribution of the concentration of the dopant contained in the glass substrate is measured (measurement step 1)

Step in which a surface shape of the glass substrate in the pre-polished state is measured (measurement step 2)

In measurement step 1, a distribution of the concentration of the dopant contained in the glass substrate is measured. The term "distribution of the concentration of the dopant contained in the glass substrate" herein means not the dopant concentration distribution in the glass substrate thickness direction but the distribution of the dopant concentration in each of parts of the platy glass substrate regarded as a two-dimensional shape having no thickness. Namely, that term means a concentration distribution in the plane of the platy glass substrate. Incidentally, the dopant concentration distribution in a plane which is parallel to the glass substrate surface and located at any depth in the glass substrate is assumed to be equal to the concentration distribution in the examined surface of the glass substrate.

Consequently, the measurement results obtained from measurement step 1 give a dopant concentration distribution map which indicates the dopant concentration in each part of the two-dimensional shape (hereinafter, the map is referred to as "dopant concentration distribution map").

For measuring a dopant concentration distribution, a method suitably selected according to the kind of the dopant can be used. For example, by subjecting the glass substrate surface to X-ray fluorescence analysis, a distribution of the concentration of the dopant contained in the glass substrate can be measured. In the case where the dopant is $TiO_2$, there is correlation between the $TiO_2$ concentration and the refractive index of the glass substrate. Because of this, the distribution of the concentration of the $TiO_2$ contained in the glass substrate may be nondestructively determined from results of refractive-index distribution measurement through a transmitted-wave areal measurement with a laser interference type flatness measuring device.

It is thought that the distribution of the concentration of the dopant contained in a glass substrate does not substantially change through pre-polishing. Consequently, measurement step 1 may be conducted before pre-polishing or may be conducted after pre-polishing. In the case of using a laser interference type flatness measuring device, however, it is preferred to conduct the measurement after pre-polishing because a surface shape of the glass substrate which has been pre-polished can be measured with the same device.

In measurement step 2, a surface shape of the glass substrate which has been pre-polished is measured. The surface shape of this glass substrate is measured in terms of the degree of flatness of the glass substrate surface. The term "degree of flatness of a glass substrate surface" herein means the degree of flatness, i.e., a height difference, in each part of the glass substrate surface.

Consequently, the measurement results obtained from measurement step 2 give a flatness map which indicates a height difference in each part of the glass substrate surface (hereinafter, the map is referred to as "flatness map").

The degree of flatness of the glass substrate surface can be measured, for example, with a laser interference type flatness measuring device. In the Example which will be given later, the degree of flatness of a surface of a glass substrate was measured with Fizeau type laser interference flatness measuring device G310S (manufactured by FUJINON Corp.). It should, however, be noted that the means for measuring the degree of flatness of the glass substrate surface is not limited to that device and use may be made of a method in which a laser displacement meter, ultrasonic displacement meter, or contact type displacement meter is used to measure height differences on the surface of the glass substrate and the degree of flatness is determined from the results of this measurement.

In the finishing method of the invention, conditions for finishing the glass substrate surface are set for each of parts of the glass substrate based on the results obtained from the measurement step 1 and measurement step 2 described above. In this description, to set conditions for finishing the glass substrate surface for each of parts of the glass substrate is hereinafter referred to simply as "to set glass substrate processing conditions".

In the finishing method of the invention, glass substrate processing conditions are set based on the results obtained from measurement step 1 and the results obtained from measurement step 2. For an easier understanding, the following explanation is given separately on the setting of processing conditions based on the results obtained from measurement step 1 and the setting of processing conditions based on the results obtained from measurement step 2.

When processing conditions are set based on the results obtained from measurement step 1, correlation between the concentration of the dopant contained in the glass substrate and the rate of processing the glass substrate surface (hereinafter referred to also as "correlation between dopant concentration and processing rate") is determined beforehand. The results obtained from measurement step 1 and the correlation between dopant concentration and processing rate are used to set processing conditions.

The present inventors found that when a glass substrate made of doped quartz glass is processed, there is some correlation between dopant concentration and processing rate.

For example, in the case of doped quartz glass containing $TiO_2$ as a dopant, when this doped quartz glass is processed under constant processing conditions, there is the correlation represented by the following equation (1) between the dopant concentration X (wt %) and the processing rate Y (μm/min).

$$Y = a \cdot X + b \tag{1}$$

In equation (1), a and b represent variables.

FIG. 1 is graphs showing correlations between dopant concentration and processing rate in doped quartz glass containing $TiO_2$ as a dopant. The correlations shown are one in the case of using gas-cluster ion-beam etching as a processing technique and one in the case of using mechanical polishing with cerium oxide as a processing technique. The procedure used for drawing FIG. 1 is shown below.

Test samples (20 mm×20 mm×1 mm (thickness)) made of doped quartz glass were prepared which contained $TiO_2$ in amounts of 0%, 3.1%, 5.1%, 6.9%, and 8.7%, respectively, in terms of % by mass based on the $SiO_2$. These test samples differing in $TiO_2$ concentration were processed under the same conditions to determine the processing rates. Plots of $TiO_2$ concentration against processing rate are shown in FIG. 1. In FIG. 1, the processing rate is shown as normalized processing rate, with the processing rate value at a $TiO_2$ concentration of 0% by mass being taken as 1.

Gas-cluster ion-beam etching and mechanical polishing were conducted under the following conditions.
Gas-Cluster Ion-Beam Etching
Source gas: 1.25% $SF_6$, 24% $O_2$, 74.75% Ar
Acceleration voltage: 30 kV
Beam current: 50 μA
Beam diameter (FWHM value): 10 mm or smaller
Dose: $6.2 \times 10^{15}$ ions/cm$^2$
Mechanical Polishing
Abrasive material: cerium oxide (CO85; Speedfam Co., Ltd. (Showa Denko H-3))
Polishing pad: cerium-impregnated polyurethane pad (MHC14B; Rodel Nitta Company)
Polishing apparatus: both-side polishing machine The processing rate shown in FIG. 1 was determined from a weight change of the test sample through the processing by the gravimetric method.

When gas-cluster ion-beam etching is conducted under those processing conditions, the following equation (1-1) is obtained from FIG. 1 as a transform of equation (1). On the other hand, when mechanical polishing with cerium oxide is conducted, formula (I) is transformed to formula (1-2).

$$Y = 0.0522X + 1.0449 \tag{1-1}$$

$$Y = 0.0306X + 1.0188 \tag{1-2}$$

When a graph for the processing technique and processing conditions to be used for the finishing of a glass substrate surface is drawn beforehand like those shown in FIG. 1, the processing amount for the glass substrate surface can be set for each of parts of the glass substrate using the dopant concentration distribution map obtained from measurement step 1 and equation (1). It should, however, be noted that since equation (1) represents the relationship between the concentration of the dopant contained in the glass substrate and the rate of processing the glass substrate surface under constant processing conditions, the processing time is the only factor among processing conditions which is usable for the setting.

In a glass substrate of a two-dimensional shape having no thickness, which is the conception used with regard to dopant concentration distribution, when coordinates for the glass substrate are expressed as (x,y), then the dopant concentration distribution map obtained from measurement step 1 is expressed as C(x,y) (mass %). The processing amount and processing time for the glass substrate are expressed as W(x,y) (μm) and T(x,y) (min), respectively. Incidentally, W(x,y) represents the processing amount (predetermined processing amount) for that part of the glass substrate which is specified by the coordinates (x,y), and is a constant. For example, in the case where that part of the glass substrate which is specified by the coordinates (x,y) is to be processed in an amount of 5 μm, then W(x,y)=5 μm.

The relationship between W(x,y) and T(x,y) is expressed by the following equation (2).

$$T(x,y) = W(x,y) / (a \times C(x,y) + b) \tag{2}$$

Consequently, when glass substrate processing conditions are to be set based on the results obtained from measurement step 1, then the glass substrate processing conditions, specifically processing time, may be set according to equation (2).

When processing conditions are to be set based on the results obtained from measurement step 2, then the degree of flatness of the glass substrate surface is determined through measurement step 2 and the processing conditions are set based on this.

As described above, the results of measurement step 2 are obtained as a flatness map. Similarly to the above, when coordinates for a glass substrate of a two-dimensional shape are expressed as (x,y), then the flatness map is expressed as S(x,y) (μm). The processing time is expressed as T(x,y) (min). When the processing rate is expressed as Y (μm/min), the relationship among these is represented by the following equation (3).

$$T(x,y) = S(x,y)/Y \tag{3}$$

Consequently, when processing conditions are to be set based on the results obtained from measurement step 2, then the processing conditions, specifically processing time, are set according to equation (3).

In the finishing method of the invention, glass substrate processing conditions are set by conducting, in combination, the setting of processing conditions based on the results obtained from measurement step 1 and the setting of processing conditions based on the results obtained from measurement step 2.

Likewise, when coordinates for a glass substrate of a two-dimensional shape are expressed as (x,y) and the dopant concentration distribution map obtained from measurement step 1, the flatness map obtained from measurement step 2, and the processing time are expressed as C(x,y) (mass %), S(x,y) (μm), and T(x,y) (min), respectively, then the relationship among these is represented by the following equation (4).

$$T(x,y)=S(x,y)/(a \times C(x,y)+b) \quad (4)$$

Consequently, when processing conditions are to be set based on the results obtained from measurement step 1 and measurement step 2, then the processing conditions, specifically processing time, are set according to equation (4).

The processing technique to be used in the finishing method of the invention is not particularly limited as long as processing conditions for processing the glass substrate by the processing technique can be set based on the results obtained from measurement step 1 and measurement step 2. Namely, the technique is not particularly limited as long as the range to be processed by one processing operation can be sufficiently small and conditions for processing by this technique can be easily set based on the results of measurement step 1 and measurement step 2. Consequently, the processing technique may be mechanical polishing with a polishing pad having a small diameter, e.g., a polishing pad having a diameter of about 2 cm. It is, however, preferred to use a processing technique selected from the group consisting of ion-beam etching, gas-cluster ion-beam etching, plasma etching, nano-abrasion, and MRF (magnetorheological finishing), because it is easy to set conditions for these processing techniques based on the results of measurement step 1 and measurement step 2, e.g., to set a processing time according to equation (4).

Of the processing techniques shown above, the techniques in which the glass substrate surface is irradiated with a beam, i.e., ion-beam etching, gas-cluster ion-beam etching, and plasma etching, have an advantage that glass substrate processing conditions can be further set based on the results obtained from measurement step 2. The procedure for this setting is explained below in detail.

In conducting this setting procedure, the results obtained from measurement step 2 are used to specify the width of waviness present on the glass substrate surface. The term width of waviness means the length of each recess or protrusion in the recesses and protrusions present periodically in the glass substrate surface. Consequently, the width of waviness generally is one-half the period of the waviness. In the case where the glass substrate surface has two or more kinds of waviness differing in period, the width of the waviness having the shortest period is taken as the width of the waviness present on the glass substrate surface.

As described above, the measurement results obtained from the measurement step 2 are a flatness map which indicates height differences among parts of the glass substrate surface. Consequently, the width of waviness present on the glass substrate surface can be easily specified from the flatness map.

The width of waviness specified by the procedure described above is used as a reference to conduct dry etching using a beam having a diameter not larger than the width of waviness. The beam diameter herein is expressed in terms of FWHM (full width of half maximum). In this description, the term beam diameter hereinafter means the FWHM value of beam diameter. In the finishing method of the invention, it is more preferred to use a beam having a diameter not larger than one-half the width of waviness. As long as a beam having a diameter which is not larger than one-half the width of waviness is used, the waviness present on the surface of the glass substrate can be irradiated with the beam so that the beam is centered on the waviness. The waviness can hence be effectively removed.

When a technique in which the glass substrate surface is irradiated with a beam, i.e., ion-beam etching, gas-cluster ion-beam etching, or plasma etching, is used, it is necessary to conduct beam scanning of the surface of the glass substrate. This is because it is necessary that the range to be irradiated with a beam in one operation should be minimized for setting conditions for the processing of the glass substrate. Especially when a beam having a diameter not larger than the width of waviness is used, it is necessary to conduct beam scanning of the glass substrate surface. Known techniques for beam scanning include raster scanning and spiral scanning, and either of these may be used.

In the case where a processing time (beam irradiation time in this case) is to be set according to equation (4) in the finishing method of the invention, the setting is conducted so as to obtain an irradiation time T(x,y) at the coordinates (x,y). Namely, the speed of movement of the beam relative to the glass substrate is determined while taking account of beam intensity profile, scanning pitch, and dose to thereby obtain the set value of irradiation time T(x,y). In the case of using mechanical polishing also, the speed of movement of a small-diameter polishing pad relative to the glass substrate is likewise determined while taking account of the distribution of the amount of polishing per unit time period with the small-diameter polishing pad to thereby obtain the set value of processing time T(x,y).

Preferred of those techniques in which the glass substrate surface is irradiated with a beam is gas-cluster ion-beam etching. This is because this technique can process the glass substrate so as to have a surface having reduced surface roughness and excellent smoothness.

Gas-cluster ion-beam etching is a technique which comprises injecting a reactant (source gas), which is gaseous at normal temperature and normal pressure, in a compressed state into a vacuum apparatus through an expansion type nozzle to thereby form gas clusters, ionizing the gas clusters by electron irradiation, and causing the resultant gas-cluster ion beam to strike on and thereby etch the substance to be processed. A gas cluster generally is an atom or molecule aggregate composed of several thousand atoms or molecules. When gas-cluster ion-beam etching is used in the finishing method of the invention, gas clusters collide against the glass substrate surface and the resultant interaction with the solid produces a multi-body collision effect to process the glass substrate surface.

When gas-cluster ion-beam etching is employed, gases such as, e.g., $SF_6$, Ar, $O_2$, $N_2$, $NF_3$, $N_2O$, $CHF_3$, $CF_4$, $C_2F_6$, $C_3F_8$, $C_4F_6$, $SiF_4$, and $COF_2$ can be used alone or as a mixture thereof as a source gas. Of these, $SF_6$ and $NF_3$ are superior as a source gas from the standpoint of chemical reaction occurring upon collisions against the glass substrate surface. A mixed gas containing $SF_6$ or $NF_3$ is therefore preferred. Examples thereof include a mixed gas comprising $SF_6$ and $O_2$, mixed gas comprising $SF_6$, Ar, and $O_2$, mixed gas comprising $NF_3$ and $O_2$, mixed gas comprising $NF_3$, Ar, and $O_2$, mixed gas comprising $NF_3$ and $N_2$, and mixed gas comprising $NF_3$, Ar, and $N_2$. In these mixed gases, the proportions of the components vary depending on conditions including irradiation conditions. However, the proportions in each mixed gas are preferably as follows.

$SF_6:O_2=0.1\text{-}5\%:95\text{-}99.9\%$ ($SF_6/O_2$ mixed gas)

$SF_6:Ar:O_2=0.1\text{-}5\%:9.9\text{-}49.9\%:50\text{-}90\%$ ($SF_6/Ar/O_2$ mixed gas)

$NF_3:O_2=0.1\text{-}5\%:95\text{-}99.9\%$ ($NF_3/O_2$ mixed gas)

$NF_3:Ar:O_2=0.1\text{-}5\%:9.9\text{-}49.9\%:50\text{-}90\%$ ($NF_3/Ar/O_2$ mixed gas)

$NF_3:N_2=0.1\text{-}5\%:95\text{-}99.9\%$ ($NF_3/N_2$ mixed gas)

$NF_3:Ar:N_2=0.1\text{-}5\%:9.9\text{-}49.9\%:50\text{-}90\%$ ($NF_3/Ar/N_2$ mixed gas)

Preferred of those mixed gases is the $SF_6/O_2$ mixed gas, $SF_6/Ar/O_2$ mixed gas, $NF_3/O_2$ mixed gas, or $NF_3/Ar/O_2$ mixed gas.

Irradiation conditions such as the cluster size, ionizing current to be applied to the ionizing electrodes of a gas-cluster ion-beam etching apparatus for cluster ionization, accelerating voltage to be applied to the accelerating electrodes of the gas-cluster ion-beam etching apparatus, and dose of a gas-cluster ion beam can be suitably selected according to the kind of the source gas and the surface state of the pre-polished glass substrate. For example, for removing waviness from the glass substrate surface to improve flatness without excessively deteriorating the surface roughness of the glass substrate, it is preferred that the accelerating voltage to be applied to the accelerating electrodes should be 15-30 kV.

The finishing method of the invention can effectively remove the waviness generated in a glass substrate surface during pre-polishing and can finish the glass substrate surface so as to have excellent flatness, because glass substrate processing conditions are set based on the results obtained from measurement step 1 and measurement step 2. With the finishing method of the invention, the degree of flatness of the glass substrate surface can be improved to 50 nm or a smaller value.

When the finishing method of the invention is practiced, there are cases where the surface roughness of the glass substrate slightly deteriorates depending on the surface state of the glass to be processed and beam irradiation conditions. Furthermore, there are cases where glass substrates having some specifications cannot be processed to a desired surface roughness by the finishing method of the invention although a desired degree of flatness can be attained by the method. A further finishing treatment may hence be conducted for improving the surface roughness of the glass substrate after the finishing method of the invention has been practiced. For a finishing treatment to be conducted for such a purpose, it is preferred to use gas-cluster ion-beam etching. Consequently, in the case where gas-cluster ion-beam etching is used in the finishing method of the invention, the further finishing treatment is conducted as second gas-cluster ion-beam etching differing in irradiation conditions such as source gas, ionizing current, and accelerating voltage. For example, it is preferred to conduct the second cluster ion-beam etching under milder conditions using a lower ionizing current or lower accelerating voltage than those in the gas-cluster ion-beam etching conducted for the purpose of removing the waviness generated during pre-polishing. Specifically, the accelerating voltage is, for example, preferably 3 kV or higher and lower than 30 kV, more preferably 3-20 kV. As a source gas may be used any one of or a mixture of two or more of gases such as $O_2$, Ar, CO, and $CO_2$. This is because such gases are less apt to cause a chemical reaction upon collisions against the glass substrate surface. Preferred of these gases are $O_2$ and Ar.

EXAMPLES

The present invention will be illustrated in greater detail with reference to the following Examples, but the invention should not be construed as being limited thereto.

An ingot of $TiO_2$-doped quartz glass (doped with 7% by mass $TiO_2$) produced by a known method was prepared as a material to be processed. This ingot was cut into a plate form having a length of 153.0 mm, width of 153.0 mm, and thickness of 6.75 mm with an inner diameter saw. Thus, plate samples made of $TiO_2$-doped quartz glass were produced. Subsequently, these samples were beveled with a commercial NC beveling machine using #120 abrasive diamond grains so as to result in an outer dimension of 152 mm and a bevel width of 0.2-0.4 mm to obtain glass substrate samples.

Figure 2:
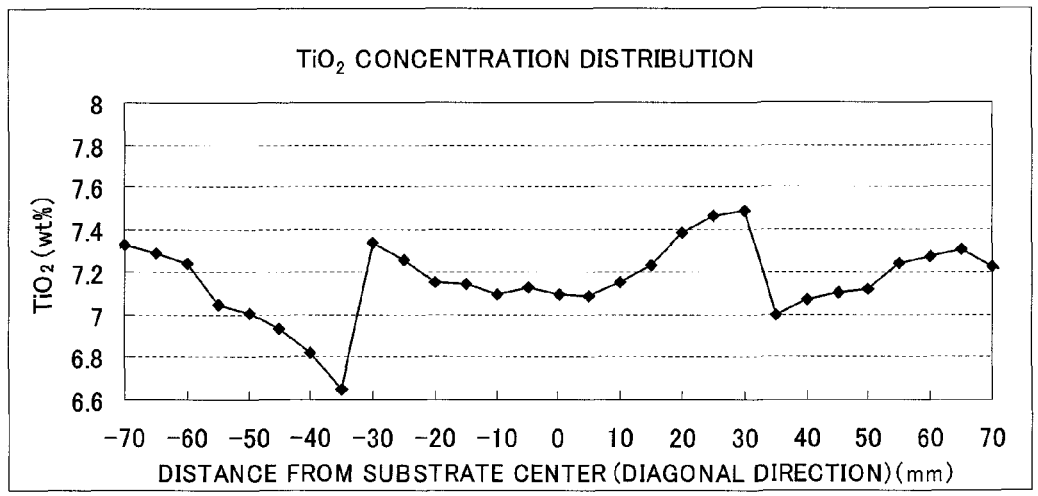
FIG. 2 is a graph showing the $TiO_2$ concentration distribution (diagonal direction) of a glass substrate sample of the Example.

The glass substrate samples were examined for $TiO_2$ concentration distribution by X-ray fluorescence analysis. FIG. 2 is a graph showing the $TiO_2$ concentration distribution along a diagonal direction of a glass substrate sample. The abscissa of the graph indicates distance from the substrate center.

An expected processing amount distribution in the case of subjecting the glass substrate sample having the $TiO_2$ concentration distribution shown in FIG. 2 to mechanical polishing as pre-polishing was calculated using equation (1-2). In the calculation, the processing amount for a $TiO_2$ concentration of 7% by mass was set at 5 μm (reference processing amount).

$$Y=0.0306X+1.0188 \quad (1\text{-}2)$$

X: dopant concentration (wt %)

Y: polishing rate (μm/min)

Figure 3:
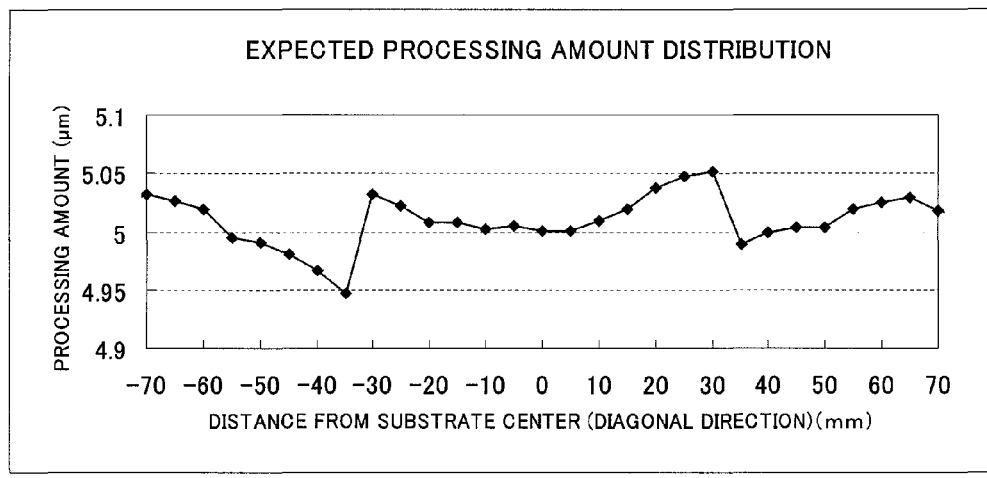
FIG. 3 is a graph showing expected processing amounts in pre-polishing for the glass substrate sample of the Example.
Figure 4:
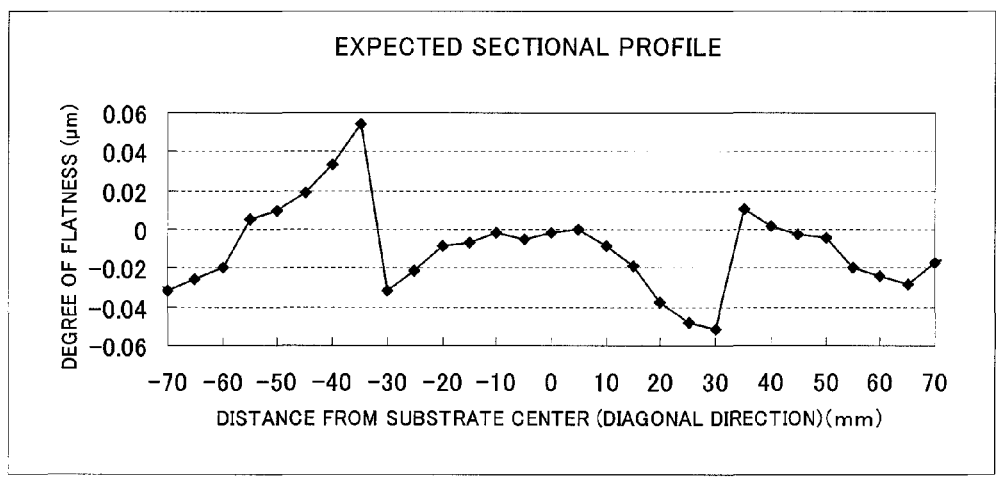
FIG. 4 is a graph showing an expected sectional profile (diagonal direction) of the glass substrate sample of the Example after pre-polishing.

FIG. 3 is a graph showing the expected processing amount distribution obtained by the procedure described above. FIG. 4 is a graph showing an expected sectional profile along the diagonal direction of the glass substrate sample after the pre-polishing; this graph is the results obtained by subtracting the expected processing amounts shown in FIG. 3 from the reference processing amount of 5 μm. In FIG. 3 and FIG. 4, the abscissa of each graph indicates distance from the substrate center.

The glass substrate sample described above was pre-polished by mechanical polishing with cerium oxide. The abrasive material, polishing pad, and polishing apparatus used were the same as those used in obtaining the results shown in FIG. 1. The processing rate and processing time used were such that the processing amount for the doped quartz glass having a $TiO_2$ concentration of 7% by mass became 5 μm.

Figure 5:
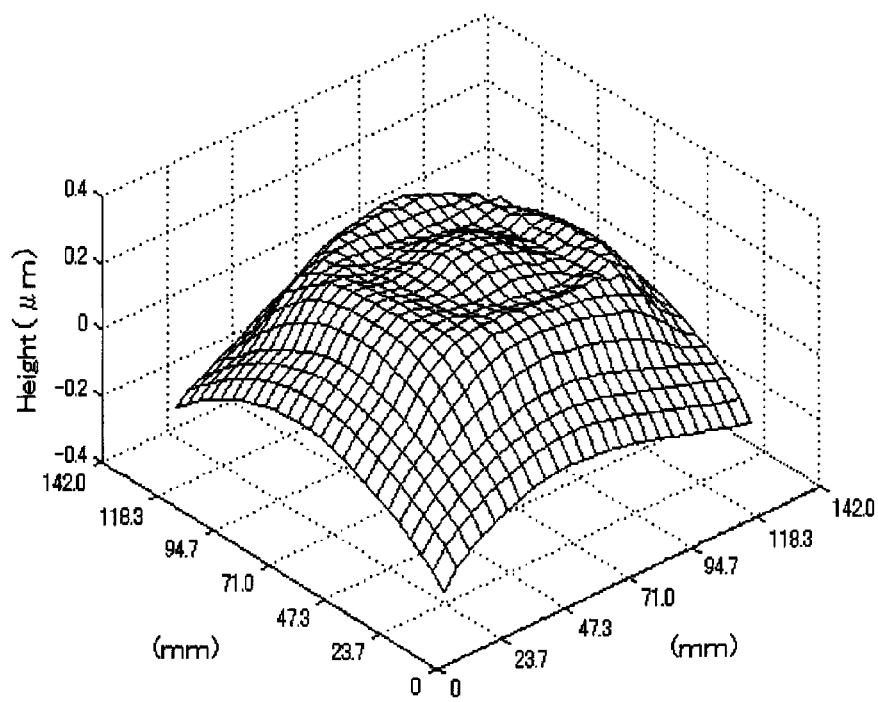
FIG. 5 illustrates the surface shape of the glass substrate sample of the Example which has undergone pre-polishing; the surface shape having been obtained from the results of an examination of the pre-polished glass substrate surface with an interference flatness meter.
Figure 6:
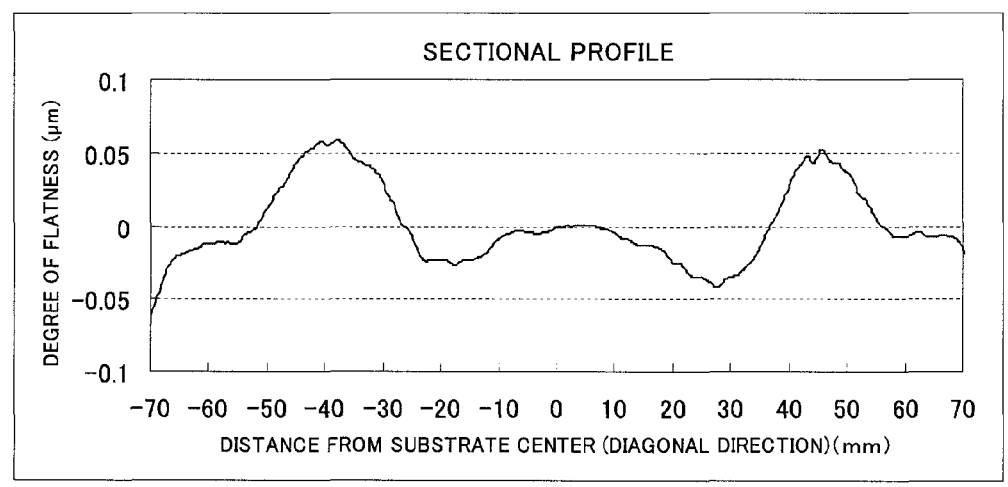
FIG. 6 is a graph showing a sectional profile (diagonal direction) of the glass substrate sample of the Example which has been pre-polished.

After the pre-polishing, the surface of the glass substrate sample was examined with an interference flatness meter (Fizeau type laser interference flatness measuring device G310S (manufactured by Fujinon Corp.). A surface shape of the glass substrate sample was drawn from the results of the examination and is shown in FIG. 5. In the surface shape of the mechanically polished glass substrate, the shape of long-period waviness and the depression of the periphery depend on the properties of the polishing pad used, processing conditions for the mechanical polishing, etc. Consequently, a diagonal-direction sectional profile of the glass substrate sample was obtained through the approximation of a tertiary aberration function and the removal of tilt, power, astigmatism, coma-aberration, and spherical aberration and is shown in FIG. 6. In FIG. 6, the abscissa of the graph indicates distance from the substrate center.

As apparent from a comparison between FIG. 4 and FIG. 6, the expected sectional profile after pre-polishing exceedingly well agreed with the sectional profile determined after actual mechanical polishing in the positions where recesses and protrusions (waviness) were present and in the heights thereof.

An expected sectional profile along a diagonal direction of the glass substrate sample after being finished by gas-cluster ion-beam etching from the state shown in FIG. 4 was drawn.

Specifically, an expected processing amount distribution in the case of finishing the glass substrate sample having the $TiO_2$ concentration distribution shown in FIG. 2 by the gas-cluster ion-beam etching method was calculated using equation (1-1). In the calculation, the processing amount for a $TiO_2$ concentration of 7% by mass was set at 0.8 μm (reference processing amount).

$$Y = 0.0522X + 1.0449 \quad (1\text{-}1)$$

X: dopant concentration (wt %)

Y: processing rate (μm/min)

Figure 7:
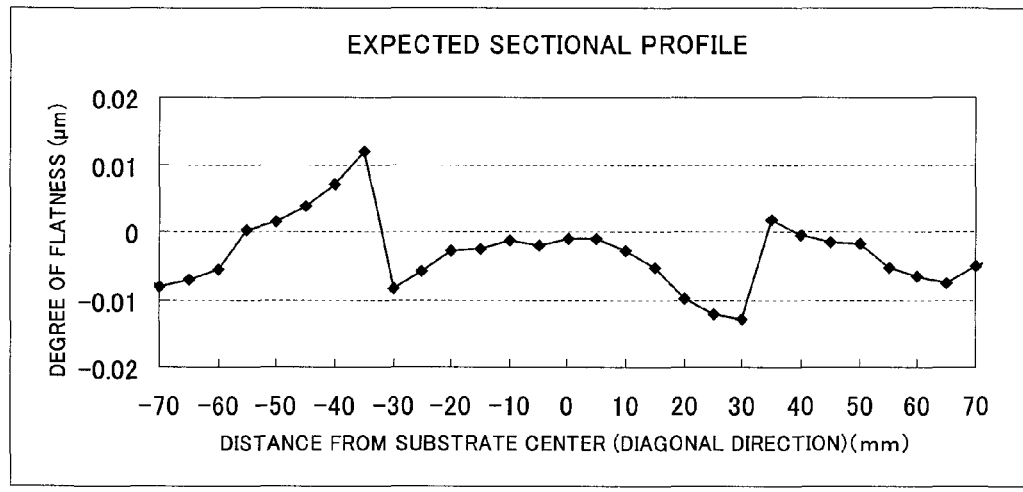
FIG. 7 is a graph showing an expected sectional profile (diagonal direction) of the glass substrate sample of the Example after finishing.

Subsequently, an expected sectional profile of the glass substrate after the finishing was drawn based on the results obtained by subtracting the expected processing amounts obtained by the procedure described above from the expected sectional profile shown in FIG. 4. FIG. 7 is a graph showing the expected sectional profile (diagonal direction) of the glass substrate after the finishing. In FIG. 7, the abscissa of the graph indicates distance from the substrate center.

On the other hand, the glass substrate sample which had been pre-polished by the procedure described above was further finished by gas-cluster ion-beam etching. The conditions for the gas-cluster ion-beam etching were the same as the conditions used in obtaining the results shown in FIG. 1. The processing rate and processing time used were such that the polishing amount for the doped quartz glass having a $TiO_2$ concentration of 7% by mass became 0.8 μm.

Figure 8:
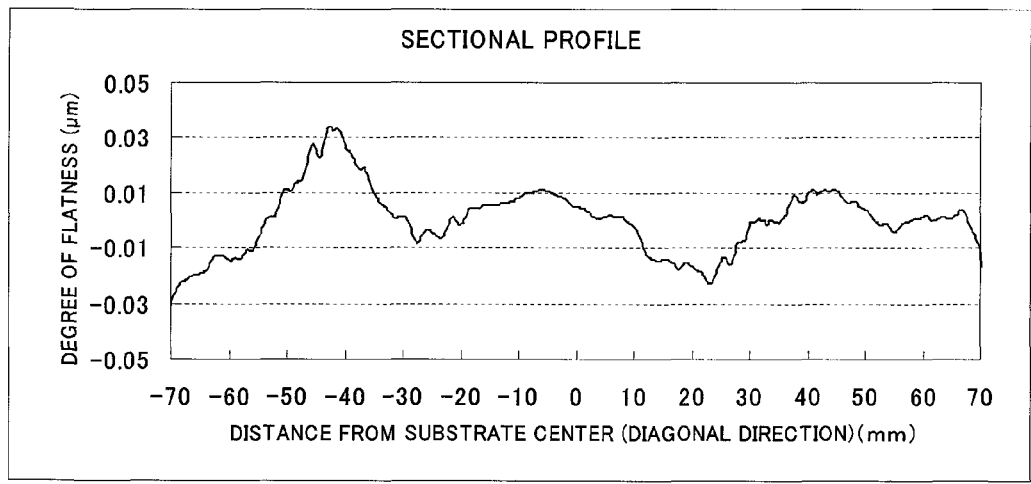
FIG. 8 is a graph showing a sectional profile (diagonal direction) of the glass substrate sample of the Example which has been finished.

The surface of the glass substrate sample which had undergone the finishing was examined with an interference flatness meter. The examination results obtained were processed by approximating a tertiary aberration function and removing tilt, power, astigmatism, coma-aberration, and spherical aberration. The diagonal-direction sectional profile of the glass substrate sample thus obtained is shown in FIG. 8. In FIG. 8, the abscissa of the graph indicates distance from the substrate center.

As apparent from a comparison between FIG. 7 and FIG. 8, the expected sectional profile after finishing exceedingly well agreed with the sectional profile determined after actual finishing in the positions where recesses and protrusions were present and in the heights thereof.

As apparent from the results given above, the glass substrate surface which has undergone pre-polishing has waviness attributable to a dopant concentration distribution of the glass substrate. It has been impossible to completely remove the waviness by finishing. However, positions and heights of the waviness exceedingly well agree with the expected values obtained from the dopant concentration distribution and from correlation between dopant concentration and processing rate.

In the finishing method of the invention, conditions for glass substrate processing are set based on the results obtained from measurement step 1 and measurement step 2. The method is hence thought to be capable of completely removing the waviness generated during pre-polishing and of finishing the glass substrate surface to impart excellent flatness thereto.

The present invention has been described in detail and with reference to specific embodiments thereof, it will be apparent to one skilled in the art that various changes and modifications can be made therein without departing from the spirit and scope thereof.

This application is based on Japanese Patent Application No. 2005-173505 filed Jun. 14, 2005, the contents thereof being herein incorporated by reference.

Industrial Applicability

By using the finishing method of the invention, the glass substrate can be finished so as to have a surface with excellent flatness. Thus, a glass substrate having excellent flatness can be obtained which is capable of conforming to, e.g., substrates for optical parts of lithographic exposure tools for producing next-generation semiconductor devices having a line width of 45 nm or smaller.

The invention claimed is:

1. A method of finishing a pre-polished glass substrate surface,
   the glass substrate being made of quartz glass containing a dopant and comprising $SiO_2$ as a main component,
   the finishing method comprising:
      measuring a concentration distribution of the dopant contained in the glass substrate; and
      measuring a surface shape of the glass substrate in the pre-polished state,
   wherein conditions for processing the glass substrate surface are set for each part of the glass substrate based on the measurement results of the concentration distribution of the dopant and the surface shape of the glass substrate, and
   processing the glass substrate according to the conditions set for each part of the glass substrate.

2. The method of finishing a pre-polished glass substrate surface of claim 1, wherein the glass substrate comprises a low-expansion glass having a coefficient of thermal expansion at 20° C. of 0±30 ppb/° C.

3. The method of finishing a pre-polished glass substrate surface of claim 1, wherein the dopant is $TiO_2$.

4. The method of finishing a pre-polished glass substrate surface of claim 1, wherein the glass substrate in the pre-polished state has a surface roughness (Rms) of 5 nm or lower.

5. The method of claim 1, wherein the glass substrate is a $TiO_2$-doped quartz glass; the concentration distribution is measured by X-ray fluorescence; the surface shape of the glass substrate in the pre-polished state is measured with an interference flatness meter; and the processing includes ion-beam etching.

6. The method of claim 1, further comprising:
   forming at least one of a reflecting multilayered film and an absorber layer on the glass substrate after the processing.

7. The method of finishing a pre-polished glass substrate surface of claim 1,
   wherein correlation between the concentration of the dopant contained in the glass substrate and a rate of processing the glass substrate surface is determined beforehand, and
   wherein the conditions for processing the glass substrate surface are set for each part of the glass substrate based on the measurement results of the concentration distribution of the dopant and the correlation between the dopant concentration and the processing rate.

8. The method of finishing a pre-polished glass substrate surface of claim 7,
wherein a degree of flatness of the glass substrate surface is determined from the measurement results of the surface shape of the glass substrate, and
wherein the conditions for processing the glass substrate surface are set for each part of the glass substrate based on the degree of flatness of the glass substrate surface.

9. The method of claim 1, further comprising:
pre-polishing the glass substrate.

10. The method of claim 9, wherein the pre-polishing includes mechanical polishing.

11. The method of finishing a pre-polished glass substrate surface of claim 1, wherein the processing of the glass substrate surface is conducted by a processing technique selected from the group consisting of ion-beam etching, gas-cluster ion-beam etching, plasma etching, nano-abrasion, and MRF (magnetorheological finishing).

12. The method of finishing a pre-polished glass substrate surface of claim 11,
wherein the processing technique is ion-beam etching, gas-cluster ion-beam etching, or plasma etching,
wherein a width of waviness present on the glass substrate surface is specified from the measurement results of the surface shape of the glass substrate, and
the processing is conducted with a beam having a diameter in terms of FWHM (full width of half maximum) not larger than the width of the waviness.

13. The method of finishing a pre-polished glass substrate surface of claim 12, wherein the gas-cluster ion-beam etching is carried out with a source gas that is selected from the group consisting of an $SF_6/O_2$ mixed gas, an $SF_6/Ar/O_2$ mixed gas, an $NF_3/O_2$ mixed gas, an $NF_3/Ar/O_2$ mixed gas, an $NF_3/N_2$ mixed gas, and an $NF_3/Ar/N_2$ mixed gas.

14. The method of finishing a pre-polished glass substrate of claim 13, wherein the source gas is selected from the group consisting of an $SF_6/O_2$ mixed gas, an $SF_6/Ar/O_2$ mixed gas, an $NF_3/O_2$ mixed gas, and an $NF_3/Ar/O_2$ mixed gas.

15. The method of finishing a pre-polished glass substrate surface of claim 12, wherein the beam diameter in terms of FWHM is not larger than one-half the width of the waviness.

16. The method of finishing a pre-polished glass substrate surface of claim 15, wherein the gas-cluster ion-beam etching is carried out with a source gas that is selected from the group consisting of an $SF_6/O_2$ mixed gas, an $SF_6/Ar/O_2$ mixed gas, an $NF_3/O_2$ mixed gas, an $NF_3/Ar/O_2$ mixed gas, an $NF_3/N_2$ mixed gas, and an $NF_3/Ar/N_2$ mixed gas.

17. The method of finishing a pre-polished glass substrate of claim 16, wherein the source gas is selected from the group consisting of an $SF_6/O_2$ mixed gas, an $SF_6/Ar/O_2$ mixed gas, an $NF_3/O_2$ mixed gas, and an $NF_3/Ar/O_2$ mixed gas.

18. The method of finishing a pre-polished glass substrate surface of claim 15, wherein the processing technique is gas-cluster ion-beam etching.

19. The method of finishing a pre-polished glass substrate surface of claim 18, wherein the gas-cluster ion-beam etching is carried out with a source gas that is selected from the group consisting of an $SF_6/O_2$ mixed gas, an $SF_6/Ar/O_2$ mixed gas, an $NF_3/O_2$ mixed gas, an $NF_3/Ar/O_2$ mixed gas, an $NF_3/N_2$ mixed gas, and an $NF_3/Ar/N_2$ mixed gas.

20. The method of finishing a pre-polished glass substrate of claim 19, wherein the source gas is selected from the group consisting of an $SF_6/O_2$ mixed gas, an $SF_6/Ar/O_2$ mixed gas, an $NF_3/O_2$ mixed gas, and an $NF_3/Ar/O_2$ mixed gas.

* * * * *